United States Patent [19]

Djupsjöbacka

[11] Patent Number: 4,850,667
[45] Date of Patent: Jul. 25, 1989

[54] ELECTRODE ARRANGEMENT FOR OPTOELECTRONIC DEVICES

[75] Inventor: Anders G. Djupsjöbacka, Solna, Sweden

[73] Assignee: Telefonaktiebolaget L M Ericsson, Stockholm, Sweden

[21] Appl. No.: 174,810

[22] Filed: Mar. 29, 1988

[30] Foreign Application Priority Data

Apr. 14, 1987 [SE] Sweden .............................. 8701564

[51] Int. Cl.$^4$ .............................................. G02B 6/10
[52] U.S. Cl. ................................ 350/96.14; 350/96.13
[58] Field of Search ................ 350/96.12, 96.13, 96.14

[56] References Cited

U.S. PATENT DOCUMENTS

| | | | |
|---|---|---|---|
| 4,372,643 | 2/1983 | Liu et al. ........................... | 350/96.14 |
| 4,683,448 | 7/1987 | Ducket et al. .................... | 350/96.14 |
| 4,709,978 | 12/1987 | Jackel .............................. | 350/96.14 |
| 4,732,445 | 3/1988 | Sabatier et al. .................. | 350/96.14 |
| 4,758,060 | 7/1988 | Jaeger et al. ..................... | 350/96.14 |

OTHER PUBLICATIONS

Richard A. Becker, "Multigigahertz Lumped-Element Electrooptic Modulators", *IEEE Journal of Quantum Electronics*, vol. QE-21, No. 8, Aug. 1985.
R. A. Becker et al., "Wide-Bandwidth . . . at λ=3.39, μm", Appl. Phys. Lett. 46(a) (May 1, 1985).
R. A. Becker, "Broad-Band . . . Modulators", IEEE Journal of Quantum Electronics, vol. QE-20, No. 7 (Jul. 1984).

*Primary Examiner*—William L. Sikes
*Assistant Examiner*—Robert E. Wise
*Attorney, Agent, or Firm*—Burns, Doane, Swecker & Mathis

[57] ABSTRACT

The invention relates to an electrode arrangement for optoelectronic devices. A wafer (11) of electro-optical material has on its upper surface a first elongate electrode (12) and a second U-shaped electrode (13). The electrodes (12, 13) are mutually spaced ($d_1$) apart in an interaction region ($L_1$) with light wave guides (14). The first electrode (22) has a connecting conductor (15) for an incoming microwave signal ($S_1$) with the aid of which a light wave (P) is to be modulated. The connecting conductor (15) divides the first electrode (12) into a standing wave guide (17) and a travelling wave guide (18), which is connected via resistor ($R_1$) to the second electrode (13). The incoming microwave signal ($S_1$) is divided up in the reflection point (16) into a standing wave ($S_2$) and a travelling wave ($S_3$), which co-act in the modulation of the light wave (P). The electrode arrangement results in a modulator of bandpass character, which requires relatively low voltage in the incoming microwave signal ($S_1$). The modulator center frequency can be selected by selecting the length ($L_1$) of the standing wave guide (17).

4 Claims, 5 Drawing Sheets

ELECTRODE ARRANGEMENT FOR OPTOELECTRONIC DEVICES

TECHNICAL FIELD

The invention relates to an electrode arrangement for optoelectronic devices, in which a wafer retains the electrode arrangement and at least one light wave guide is disposed in an interaction region in connection with the electrode arrangement.

BACKGROUND ART

In optoelectronic devices of the kind mentioned above, the light wave guides lie in the wafer along the electrodes in the interaction region. An incoming light wave is acted on by the effective refractive index in the light wave guides being changed with the aid of an electric field through the light wave guides. This field is generated by an electric signal which is connected to the electrodes. For high modulation frequency, when the electric signal is a microwave signal, there are problems with phase separation between the light wave and the microwave, which limits the modulator bandwidth. The light wave has greater velocity than the microwave in the interaction region so that the two waves come into counterphase at the end of the interaction distance and the modulation is counteracted. Phase separation can be reduced by making the interaction distance shorter, although this requires a correspondingly higher voltage in the modulating microwave signal. It is complicated and expensive to generate a high frequency microwave signal with high voltage, and the problem with phase separation has been attacked in different ways, e.g. as is apparent from the Swedish patent application No. 8305572-2. According to this application, one of the modulator electrodes is divided into two halves at half the interaction distance, these halves being mutually connected via a condenser. The electrode halves are each connected to a d.c. voltage at a suitable level and polarity, whereby the phase separation is counteracted. In the British patent application No. 2109580 meanderformed electrodes have been proposed for simulating a velocity of the microwave which is in agreement with the velocity of the light wave. The electrodes are complicated to manufacture and result in a modulator with small bandwidth.

In the above-mentioned apparatus, the propagation of the microwaves has been acted on for suitably modulating a light wave. It is known from another technical field, i.e. the transmissio of microwaves, to utilize tubular wave guides for the microwave. A coaxial cable is connected to the cylindrical surface on the tubular wave guide and the central conductor of the cable projects into the wave guide. The tubular wave guide has a closed end, and the coaxial cable is connected at a distance corresponding to a quarter of a wave length of the microwave from this end. The projecting central conductor functions as an antenna transmitting the microwave so that a travelling microwave occurs in the wave guide and a standing wave occurs at the end of the wave guide. A more detailed description of this apparatus is to be found, e.g. in R. E. Colling, "Foundations for Microwave Engineering", Mc Graw Hill Book Company, New York 1966, pp 183-187. However, the apparatus has not found any application in modulating a light wave.

DISCLOSURE OF INVENTION

The above-mentioned problem with phase separation between the light wave and mircrowave is solved in accordance with the invention by an electrode arrangement with a standing wave guide and a travelling wave guide. The electrode arrangement is simple and gives a bandpass modulator, the central frequency of which can be selected in a simple way and which requires low modulation voltage.

The invention has the characterizing features disclosed in the accompanying claims.

BRIEF DESCRIPTION OF DRAWINGS

An embodiment of the invention will now be described in more detail below in connection with a drawing, on which

BEST MODE FOR CARRYING OUT THE INVENTION

Figure 1:
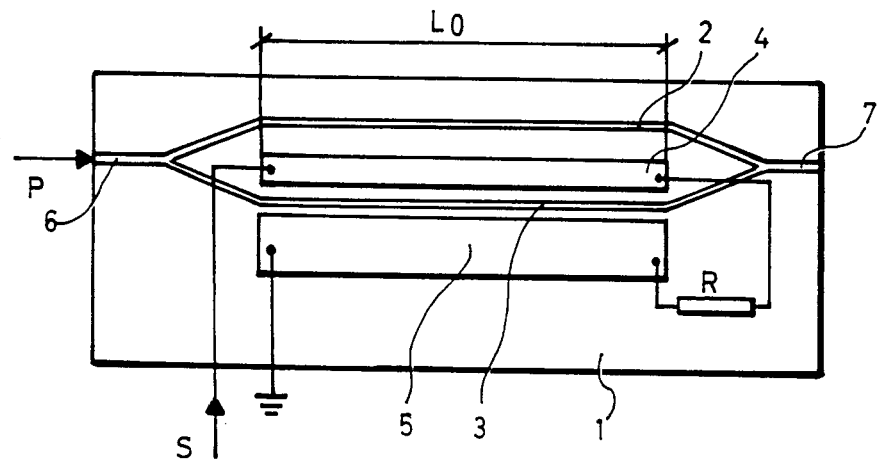
FIG. 1 illustrates a modulator of the Mach-Zender type with a known electrode arrangement.

A known light wave modulator of the Mach-Zender type is illustrated in FIG. 1. A wafer of electro-optical material has wave guides 2 and 3 as well as electrodes 4 and 5 in an interaction region having a length $L_O$. The wave guides are connected in a Y-shaped configuration to form an input 6 and an output 7 for the modulator. An incoming light wave P is divided up between the wave guides 2 and 3, the parts then mutually interfering at the output 7 to form an outgoing light wave. The refractive index in the wave guide 3 can be acted on by a voltage connected between the electrodes 4 and 5, so that there is a phase separation between the light waves in the wave guides 2 and 3. The incoming light wave is thus modulated between full strength and extinction. In order that modulation shall take place with the aid of a switching signal S the electrodes are given an initial d.c. voltage which separates the phases of the light waves in the wave guides 2 and 3 by a quarter of a light wave length. The signal S is superposed on the d.c. voltage and modulates the light wave P. It is also possible to make the wave guides 2 and 3 of different lengths during manufacture so that the light is thus phase-shifted a quarter of a light wave length and the initial direct voltage can be avoided.

For high frequency light modulation the signal S is a microwave signal and the electrodes 4 and 5 are formed as travelling wave electrodes, which are mutually connected via a resistor R. In this high frequency modulator there occurs the above-mentioned phase separation between the microwaves S and the light wave P, the upper boundary frequency for the modulator being responsive to the length $L_O$ of the modulator interaction region.

Figure 2:
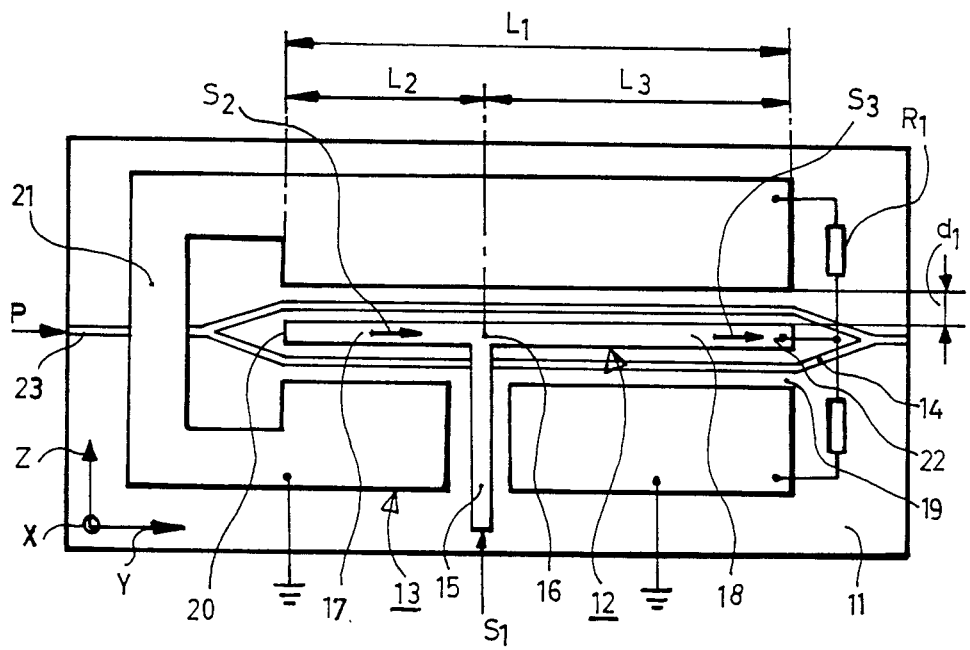
FIG. 2 illustrates a modulator of the Mach-Zender type with an electrode in accordance with the invention.
Figure 3:
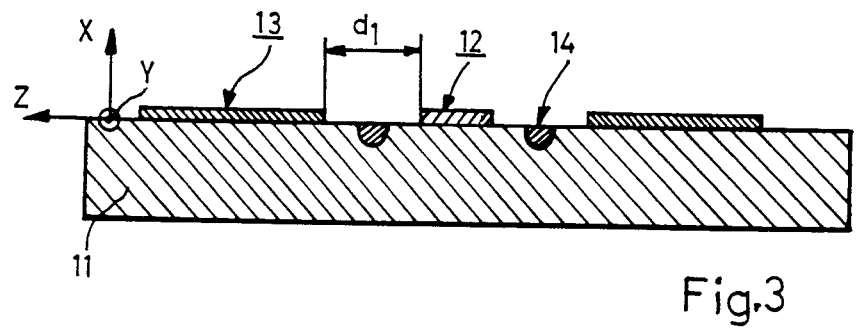
FIG. 3 is a cross section of the modulator in FIG. 2, Fiugre 4 is a diagram showing the frequency sequence for the modulator in FIG. 2.

In FIG. 2 there is illustrated an embodiment of an electrode arrangement in accordance with the invention which results in a modulator with bandpass character. A wafer 11 of electro-optical material, e.g. lithium nobiate or lithium tantalate, has a first elongate electrode 12 on its surface and a second elongate U-shaped electrode 13. The Figure also shows light wave guides 14, which have been diffused into the surface of the wafer 11. The first electrode 12 has a length $L_1$, which is the length of the region where the electrodes 12 and 13 act on the light wave guide 14, and which is the modulator interaction region. A connecting conductor 15 for a modulating microwave signal $S_1$ is connected to the first electrode 12 at a reflection point 16. This reflection point divides the first electrode into a standing wave guide 17 with a length $L_2$ and a travelling wave guide 18 with a length $L_3$. The travelling wave guide, which is is situated at the open end 19 of the U-shaped electrodes 13, is connected at its end 22 facing away from the reflection point 16 to the second electrode via resistors $R_1$. The second electrode 13 extends on both sides of the first electrode 12 in the interaction region, where it is situated at a distance $D_1$ from the first electrode 12. In this embodiment the second electrode 13 is divided by the connecting conductor 15 into two parts, which are connected to a common reference potential. The standing wave guide 17 of the first electrode 12 has one end 20 at the closed end 21 of the second electrode 13 where the electrodes are mutually spaced, and the light wave guide 14 is implemented as a Mach-Zender modulator with an input 23 for the light wave P. As described in connection with FIG. 1, the light wave guide 14 is divided in the interaction region $L_1$ into two parallel arms, which are situated between the first 12 and the second 13 electrode. The modulator in FIG. 2 is illustrated in cross section in FIG. 3, where the crystal directions X, Y and Z for lithium nobiate are also given.

The electrode arrangement 12, 13, 14 described above functions in the following manner. The electrodes 12 and 13 are assumed to be provided with an initial direct voltage as described in connection with FIG. 1, and the modulating microwave $S_1$ is connected to the connecting conductor 15. The microwave $S_1$ travels along the connecting conductor 15 to the reflection point 16 where is is divided into three part waves. A first part wave travels along the travelling wave guide 18, a second part wave is reflected back in the connecting conductor 15 and a third part wave travels along the standing wave guide 17, is reflected at its end point 20 and travels back again to the reflections point 16. In its turn, the reflected wave is divided up at the reflection point into three part waves and the part waves generated in this way successively, mutually interfere. A standing microwave $S_2$ occurs in the standing wave guides 17, and a microwave $S_3$ travels in the travelling wave guide 18, this latter microwave being diverted to the second electrode 13 via the resistor $R_1$.

Figure 4:
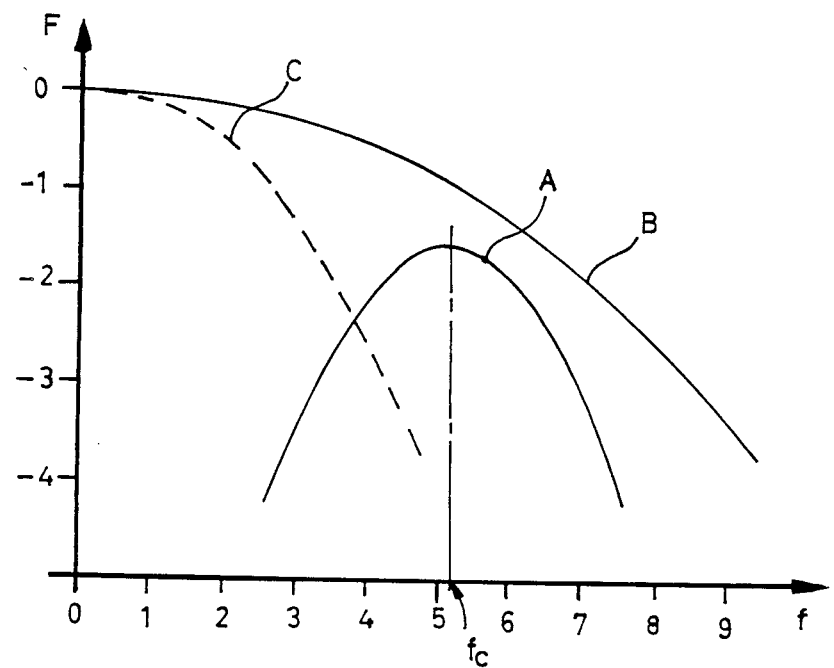

The above-described standing wave $S_2$ and the travelling wave $S_3$ act on the refractive index in the light wave guides 14 so that the incoming light wave P is modulated. This action is described more closely in the diagram in FIG. 4, where f denotes the frequency for the incoming microwave $S_1$ in GHz and F denotes in decibels the electrical power level of the microwaves.

The power level for the standing wave $S_2$ in the standing wave guide 17 is given by a graph A in the diagram, and the power level of the travelling wave $S_3$ in the travelling wave guide 18 is given by a graph B. The standing wave guide 17 has a resonance frequency $f_c$, for which the following is applicable:

$$f_c = c/(2 \times L_2 \times n\mu)$$

where c is the speed of light in vacuum, $n\mu$ is the effective microwave index for the wave guide 17 and $L_2$ its length. The incoming modulating microwave $S_1$ has maximum modulating ability in the standing wave guide 17 if its frequency is in agreement with the resonance frequency $f_c$. Both waves $S_2$ and $S_3$ co-act to give a modulated effect on the light wave guides 14 corresponding to the sum of the graph A and B. For the sake of comparison, a graph C is illustrated in the diagram, which denotes the power level in the wave guide 14 of the modulator according to FIG. 1 with the same voltage as the incoming signal for both modulators.

In the table below there are shown calculated values for a modulator according to FIG. 2. It is assumed in these calculations that the optical refractive index of the light wave guides 14 is $n_0 = 2.2$, the microwave index for the microwave guides is $n\mu = 3.8$, $L_2 = 8.0$ mm and $f_c = 4.9$ GHz. V denotes the required top value in volts for the signal S in order that a given control of the optical signal shall be obtained. $L_1$ denotes the length of the first electrode 13 in mm, $f_m$ is the optical centre frequency in GHz for the entire modulator and $f_b$ its band width in GHz.

| $L_1$ | V | $f_m$ | $f_b$ |
| --- | --- | --- | --- |
| 16 | 0,325 | 5,1 | 2,6 |
| 18 | 0,275 | 5,1 | 2,5 |
| 20 | 0,262 | 5,0 | 2,5 |
| 22 | 0,248 | 4,9 | 2,4 |
| 24 | 0,239 | 4,8 | 2,4 |
| 26 | 0,235 | 4,7 | 2,3 |

Figure 5:
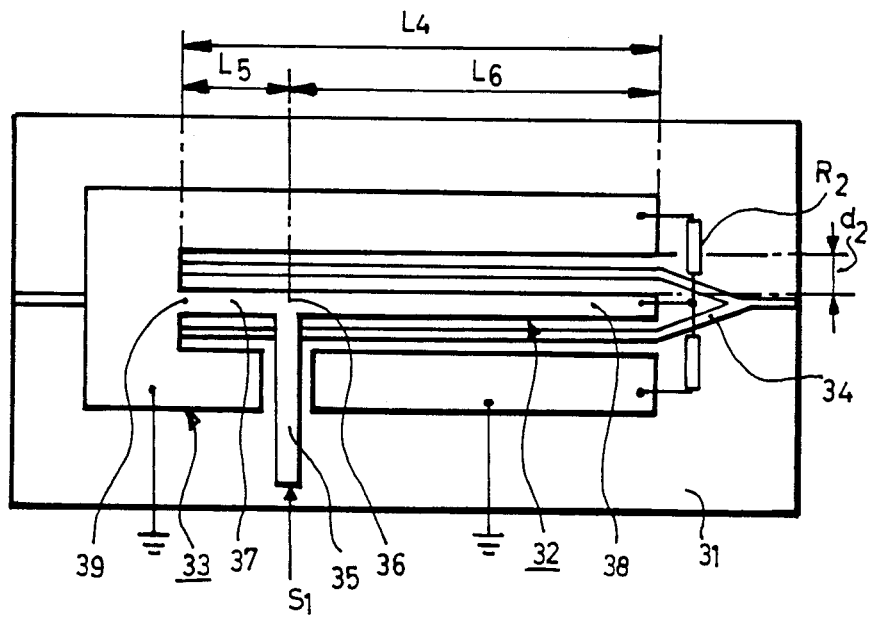
FIG. 5 illustrates a further inventive embodiment of the electrodes.

An alternative embodiment of the electrode arrangement in accordance with the invention is illustrated in FIG. 5. A wafer 31 of electro-optical material has a first elongate electrode 32 on it surface and a second elongate, U-shaped electrode 33 as well as a light wave guide 34. The length of the interaction region is denoted by $L_4$ and a connection electrode 35 for the modulating signal $S_1$ is connected to the first electrode 32 at a reflection point 36. The latter divides up the first electrode into a standing wave guide 37 with a length $L_5$ and a travelling wave guide 38 with a length $L_6$. The travelling wave guide 38 is connected via a resistance $R_2$ to the second electrode 33, which extends on both sides of the first electrode. The latter is situated at a distance $d_2$ from the second electrode in the interaction region with the length $L_4$. The electrode arrangement in FIG. 5 differs from that in FIG. 2 by the standing wave guide 37 being connected at one end 39 with the U-shaped second electrode 33 at its closed end. The standing wave guide 37 has the resonance frequency $f_c$, where $$f_c = c/(4 \times L_5 \times n\mu)$$

The electrode arrangement according to FIG. 5 differs as to its method of function from that of the electrode arrangement according to FIG. 2, above all in that the first electrode 32 is short-circuited with the second electrode 33 and cannot be given an initial direct voltage.

Figure 6:
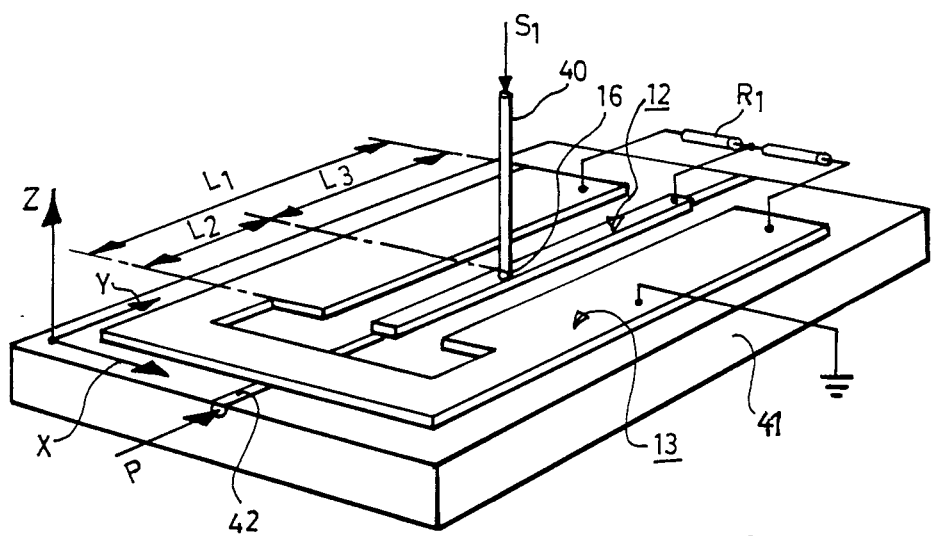
FIG. 6 is a perspective view seen obliquely from above of a variant of the electrodes.

A variant of the embodiment of the electrode arrangement described in connection with FIG. 2 is illustrated in FIG. 6. The first elongate electrode 12 is connected at the reflection point 16 with a connecting conductor 40, which is at right angles to a wafer 41, having the electrode arrangement on its upper surface. The modulator in FIG. 6 has a simple, straight wave guide 42, through which the incoming light wave P can be phase modulated by the modulating microwave signal $S_1$. For the selected crystal orientation of the waver 41, which is apparent from the X, Y, Z coordinate system drawn in, it is required that the light wave guide 42 is placed under the electrode 12 for the light wave P to be modulated.

Figure 7:
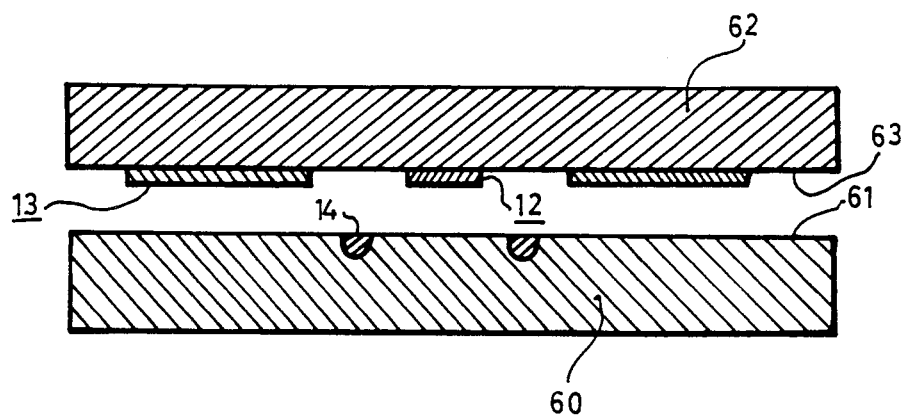
FIG. 7 is a cross section of a variant of the modulator according to FIG. 2.

A still further variant of the embodiment described in connection with FIG. 2 is illustrated in FIG. 7. A first wafer 60 of electro-optical material has the light wave guides 14 at its upper surface 61. A second wafer 62 has the electrodes 12 and 13 attached to its underside surface 63. This second wafer 62 may comprise of such as glass, electro-optical material or ceramic material. The electrodes are kept in engagement against the upper surface 61 of the first plate 60 with the aid of the second plate 62. In the Figure the electrodes 12 and 13 have been drawn spaced from the upper surface 61 for the sake of clarity.

Figure 8:
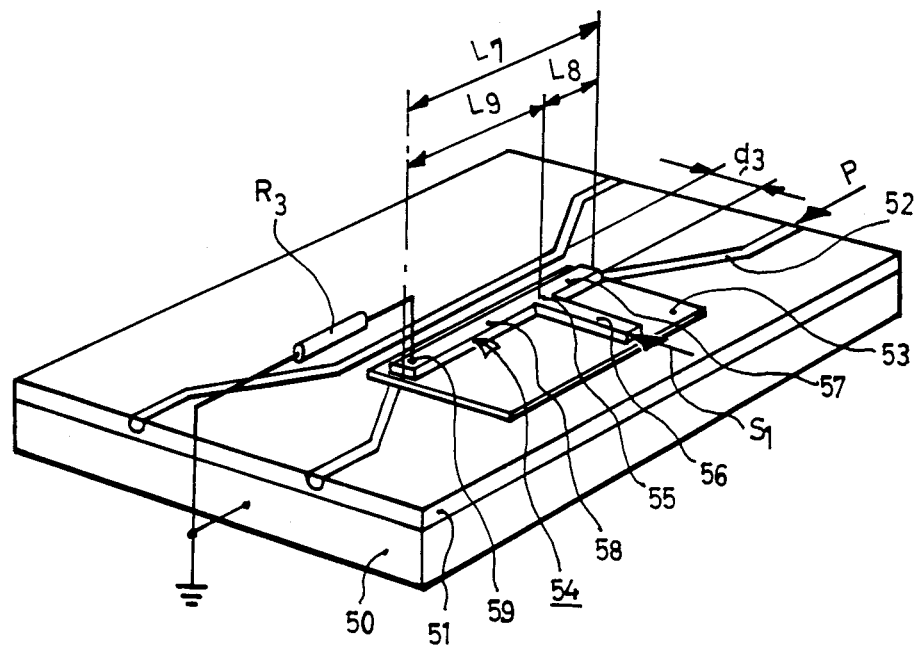
FIG. 8 is a perspective view seen obliquely from above of a directional coupler with a still further embodiment of the electrodes and FIG. 9 is a cross section of the directional coupler in FIG. 8.
Figure 9:
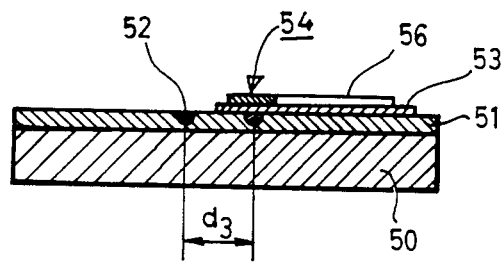

Another embodiment of the inventive electrodes is illustrated in FIG. 8 and 9 in connection with an optoelectronic directional coupler. The directional coupler includes, as illustrated in FIG. 8, a wafer 50 of heavily doped electrically conductive semi-conductor material. The wafer 50, constituting one of the electrodes in the inventive electrode arrangement, carries a layer 51 of electro-optical material into which the light wave guide 52 has been diffused. The wave guides are formed as a directional coupler having an interaction distance equal to $L_1$, and where the wave guides in the interaction region are situated at a mutual distance $d_3$. The directional coupler has a layer 53 of insulating material, which covers the light wave guide 52. Above the insulating layer 53 there has been applied a longitudinal electrode 54 having a length $L_7$. This electrode is connected at a reflection point 55 to a connecting conductor 56 for the modulating microwave $S_1$. The reflection point 55 divides the electrode 54 into a standing wave guide 57 of a length $L_8$ and a travelling wave guide 58 of a length $L_9$. The travelling wave guide is electrically connected at its end 59 facing away from the reflection point 55 to the wafer 50 via a resistor $R_3$. The end points of the electrode 54 coincide with the boundaries for the interaction region of the light wave guides 52. The elongate electrode 54 is situated immediately above one of the light wave guides of the directional coupler, as will be seen in the section in FIG. 9.

The above-described inventive electrode arrangement has the advantage that it is simple and that said centre frequency $f_m$ for the modulator for a given interaction length $L_1$ can be selected by selecting the length $L_2$ of the standing wave guide. In known bandpass modulators the centre frequency is determined at a given interaction length by the above-described phase separation between the light wave and the microwave.

I claim:

1. Electrode arrangement for optoelectronic devices, in which a wafer retains the electrode arrangement and at least one light wave guide is disposed in an interaction region in connection with the electrode arrangement, characterized in that the electrode arrangement (12, 13, 15; 32, 33, 35; 50, 54) includes a first elongate electrode (12, 32, 54) in the interaction region ($L_1$, $L_4$, $L_7$) and a second electrode (13, 33, 50) extending along the first electrode (12, 32, 54) and situated spaced ($d_1$, $d_2$) from the former in the interaction region ($L_1$, $L_4$, $L_7$), and in that a connecting conductor (15, 35, 40, 56) for a modulating electrical signal ($S_1$) is connected to the first electrode (12, 32, 54) at a reflection point (26, 36, 55) for the electrical signal ($S_1$), said reflection point being situated in the interaction region ($L_1$, $L_4$, $L_7$) and dividing the first electrode (12, 32, 54) into a standing wave guide (17, 37, 57) having an end forming a reflection boundary spaced apart from the reflection point and a travelling wave guide (18, 38, 58) having an end (22, 59) spaced apart from the reflection point (16, 36, 55) and connected to a reference potential through an impedance element.

2. Electrode arrangement as claimed in claim 1, in which said arrangement is situated at one surface of the wafer, characterized in that the second electrode (13, 33) is elongate and U-shaped and extends on both sides of the first electrode (12, 32) in the interaction region ($L_1$, $L_4$), in that the standing wave guide (17, 37) of the first electrode (12, 32) is facing towards the closed end (21) of the second electrode (13, 33) and in that the travelling wave guide (18, 38) of the first electrode is facing towards the open end (19) of the U-shaped electrode (13, 33).

3. Electrode arrangement as claimed in claim 2, characterized in that the end (20) of the standing wave guide (19) facing away from the reflection point (16) is situated spaced from the closed end (21) of the second U-shaped electrode (13).

4. Electrode arrangement as claimed in claim 2, characterized in that the end (39) of the standing wave guide (37) facing away from the reflection point (36) is connected to the closed end of the second U-shaped electrode (33).

* * * * *